April 8, 1952          A. B. FOX          2,592,262
SLIDE MOUNT
Filed March 10, 1948
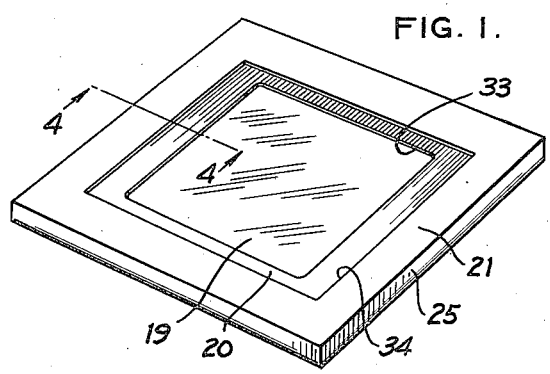
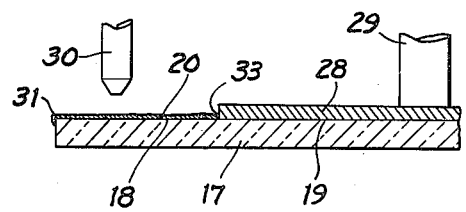
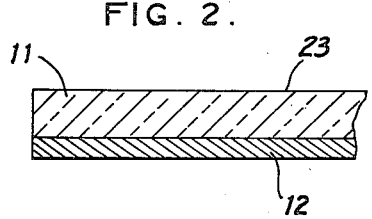
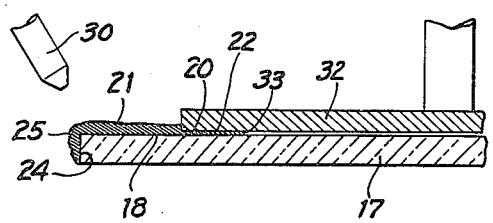
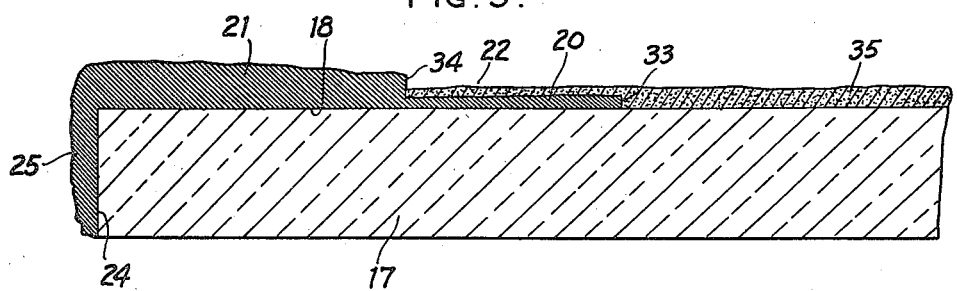
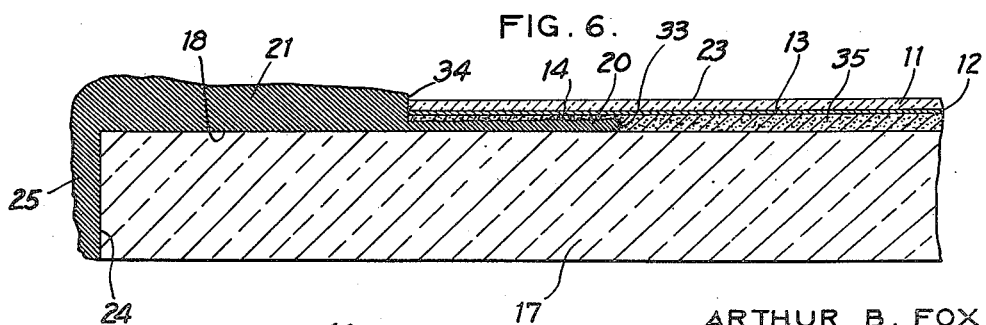
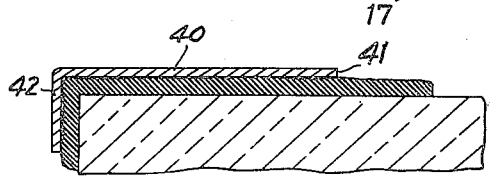
ARTHUR B. FOX
*INVENTOR*
BY
*ATTORNEYS*

Patented Apr. 8, 1952

2,592,262

UNITED STATES PATENT OFFICE 2,592,262

SLIDE MOUNT

Arthur B. Fox, Rochester, N. Y., assignor to Eastman Kodak Company, Rochester, N. Y., a corporation of New Jersey Application March 10, 1948, Serial No. 14,069

14 Claims. (Cl. 40—154)

The present invention relates to a slide mount for holding a film transparency for viewing and/or projecting.

Two general types of mounts are now in use for mounting or holding transparencies. The first type comprises a mount having overlying paper members between which the transparency is positioned or sandwiched. The members of the mount are formed with registering apertures which serve to frame the image-bearing portion of the transparency. When a plastic material is used instead of paper, one of the members may be eliminated and the transparency held in a seat in the other member by means of bent-over edges or beads. However, with both paper and plastic mounts, the emulsion of the transparency is unsupported and is exposed and may be damaged, as is apparent. Also, in case of paper mounts, dirt may adhere to the film due to electro-static attraction. In addition, the edges of the paper mounts may become frayed when used in an automatic slide changer, and such frayed edges may interfere seriously with; and, in extreme cases, may prevent feeding of the mount. Finally, while such paper or plastic mounts have had a fair degree of success when used with low-wattage projectors, they are far from satisfactory when used in connection with lamps of high wattage. These high wattage lamps cause the film or transparency to buckle, and thus throw it out of focus, the disadvantages of which are well known to those who use such mounts.

In order to overcome some of these difficulties, mounts are also provided in which the transparency is positioned or sandwiched between two layers or sheets of glass. These glass sheets serve to support and strengthen the transparency and thus greatly reduce and may even do away with the buckling problem. However, when such mounts are used with high wattage lamps, the heat incident thereto often causes the solvents and/or moisture in the film to boil out and then condense to form a fog or blemish on the transparency, the disadvantages of which are deemed to be obvious. In addition, as the transparency is positioned between two glass layers, it is difficult to cool the transparency effectively even when cooling air is passed over the exposed surfaces of the glass plates. Also, under the heat of the high wattage lamps, color transparencies fade more rapidly due to the difficulty in cooling. In forming such glass-bound transparencies, the edges of the glass plates are often held in assembled relation by means of binding tape applied to the edges of the glass plates. This binding tape often binds or jams when the mounts are used in connection with an automatic slide changer. Finally, such double glass mounts are quite heavy.

In order to provide an effective support for the transparency, yet eliminate the disadvantage of paper, plastic and double glass mounts, a new technique has recently been developed for mounting transparencies. This technique embodies the direct cementing of the emulsion of the transparency to the surface of a gelatin-coated glass plate. In this procedure, a solvent or softening agent is applied to the emulsion of the transparency and also to the gelatin on the glass surface. The emulsion side of the transparency is then placed face down on the gelatin layer of the plate and pressure is then applied to the assembled structure to cause a binding of the emulsion to the gelatin layer. It has been found that with such an arrangement, the transparency is secured to and supported by the glass plate, and may be readily handled in a slide projector having a high wattage lamp. The emulsion side of the transparency is protected against damage, while the back is exposed to facilitate proper cooling.

The advantages of this new cementing technique are utilized in the mount of the present invention. To secure this result, a clear rigid transparent plate is preheated; and a mask equal in size to the image area of the transparency, is then placed centrally on one surface of the glass plate. A layer of opaque metal is then applied to the balance of the glass surface to provide an opaque coating thereon. This metal is preferably applied by spraying, the glass being rotated during such application. While various low melting point metals may be used, it is preferred to employ aluminum because of its cheapness and its heat-reflecting characteristics. This aluminum is sprayed in a thin layer, approximately .0005 inch in thickness, over the surface of the glass not protected by the mask. The latter is then removed to expose an uncoated section which is equal in size to the image-bearing area of the transparency.

A second mask equal in size to the dimensions of the transparency is positioned on the coated surface to overlie and in substantial concentric relation with the uncoated section. A second layer of sprayed aluminum is then applied to the first layer to cover all the portions thereof not protected by the second mask. During this second coating operation the glass plate is also rotated, as in the first coating, and the metal spray gun is directed at an angle to the surface and is positioned near the edge of the glass plate. Such an arrangement builds up a heavier deposit near the edge of the glass plate tapering toward the edge of the second mask. In addition, a layer of sprayed metal is applied to the edge of the glass plate to eliminate sharp edges and corners, the advantage of which will be readily apparent to those in the art. This second coating or layer is much thicker than the initial coating, being about .008 to .010 inch in thickness. When the second mask is removed a seat is formed at the juncture of the two coatings. This seat is of a size to readily receive the transparency. A portion of the bottom of this seat is covered by the first coating and underlies the marginal or non-image bearing portions of the transparency so that only the image area of the latter is framed by the uncoated section.

These sprayed coatings afford sharp clear edges, the advantage of which will be readily appreciated. A layer of adhesive, such as gelatin, is then applied over the bottom of the seat. The emulsion side of the transparency and the gelatin are treated, as above described, and the film is placed emulsion side down on the gelatin so as to adhere thereto and form a secure bond therewith to attach the transparency securely to the glass plate. The second coating extends above the back of the transparency and thus protects the latter when the slides are stacked or moved in a slide changing apparatus. Preferably, the second layer gradually increases in thickness from the edge of the transparency to the edge of the glass plate.

The invention has, therefore, as its principal object, a one-piece slide mount which adequately protects the film or transparency against scuffing, and prevents buckling thereof when used in high wattage projectors.

Still another object of the invention is the provision of a mount which is less subject to breakage than one protected by a loose mask and binding tape.

Another object of the invention is the provision of a mount of a simple construction so that even if broken, the pieces will hold together and permit the removal of the transparency for remounting.

A further object of the invention is the provision of a mount which provides a desirable support for the transparency yet permits adequate cooling thereof.

To these and other ends, the invention resides in certain improvements and combinations of parts, all will be hereinafter more fully described, the novel features being pointed out in the claims at the end of the specification.

In the drawings:

Fig. 1 is a perspective view of a glass slide mount constructed in accordance with the preferred embodiment of the invention;

Fig. 2 is a sectional view through a portion of a transparency used in connection with the mount of the present invention showing the relation of the emulsion layer;

Fig. 3 is a side elevation view of a mount showing the first steps in its formation;

Fig. 4 is a view similar to Fig. 3, showing the second step in the mount formation;

Fig. 5 is a view similar to Figs. 3 and 4, but on a larger scale than the latter, showing the relation of the mount parts with the adhesive layer for securing the transparency of Fig. 2 in position in the mount; and Fig. 6 is a view similar to Fig. 5 showing the transparency in position to complete the mount structure.

Fig. 7 is a partial sectional view through a modified slide construction.

Similar reference numerals throughout the various views indicate the same parts.

The mount of the present invention is primarily designed for use in connection with a positive film transparency which may be either black-and-white or colored. Such a transparency comprises a transparent base or support 11, one face of which is coated with a sensitized emulsion layer 12, the central portion 13 of which carries the image. The marginal or non-image-bearing portions 14, on the other hand, are usually covered during projecting, as is well known. As such transparencies may be of any suitable and well known construction, and do not, per se, constitute a part of the present invention, further detailed description or illustration thereof are not deemed necessary.

The structural features of the mount will first be described, after which the method of formation of the mount will then be set forth. The slide mount comprises a clear rigid transparent base or support of the desired size and any suitable material such, for example, a glass plate 17. In order that the image-bearing portion 13 of the transparency may be projected while the marginal non-image-bearing portions 14 are blocked or masked off, the glass plate 17 has the marginal portions of the surface 18 coated with an opaque material so as to leave a clear uncoated section 19 which is equal in size to and adapted to frame the image-bearing portion 13 of the transparency. The portions of the surface 18 immediately adjacent the uncoated section 19 are provided with a thin opaque layer 20 which effectively masks off the marginal portions 14 of the transparency, as is clearly illustrated in Fig. 6. This layer 20, as stated above, is approximately .0005 inch in thickness and is equal in size to the dimensions of the transparency. The balance of the surface 18 is then provided with a thicker opaque coating 21 (.008 inch to .010 inch in thickness) which terminates at the layer 20 to provide a recessed seat 22 adapted to receive the transparency, as best shown in Fig. 6. This thicker coating projects above the back 23 of the transparency to protect the latter, and preferably increases in thickness as it approaches the outer edge 24 of the plate 17. This thicker coating is also extended down over the edge, as shown in 25, to cover the latter to eliminate sharp edges or corners, the advantage of which will be deemed apparent.

While the layer 20 and coating 21 may be applied in any suitable manner, they are preferably applied by the well known spray gun method. Any suitable low melting point metal such as solder, lead or tin may be used, but it is preferred to employ aluminum not only because of its cheapness but also because of its good heat-reflecting characteristics. Before the metal is sprayed on the glass plate, the latter is heated so as to eliminate thermal shock. A mask 28, equal in size to the portion 13, is positioned centrally on the surface 18 of the glass plate 17. Handling means such as a post 29 may be secured to the mask 28 to facilitate handling thereof. A metal spray gun 30, positioned as shown in Fig. 3 and supplied with aluminum in a well known manner, directs the aluminum spray towards the surface 18 to coat the latter at all points except that covered by the mask 28. As mentioned above, this layer is relatively thin, being only about .0005 inch in thickness. This layer extends slightly over the upper corner of the plate, as shown at 31, Fig. 3.

The mask is then removed leaving the thin layer 20 and the uncoated section 19, Fig. 3. A second mask 32 of a size equal to that of the transparency is then placed on the plate 18 to overlie the section 19 and the adjacent portions of the layer 20, as shown in Fig. 4. A separate and thicker coating 21 of sprayed aluminum is then applied to the balance of the layer 20 not protected by the mask 32. In this second spraying operation, the spray gun 30 is positioned as shown in Fig. 4 so that a portion of the sprayed metal will cover the edge 24 of the plate 17. During both spraying operations, the glass 17 is rotated to insure an even coating.

The mask 28 serves to provide a sharp inner edge 33 for the layer 20 to clearly frame the image-bearing section 13 of the transparency. The mask 32, on the other hand, provides a square sharp shoulder 34 which positions the transparency accurately in the seat 32, as is apparent from an inspection of Fig. 6. In order that the transparency may be held securely in the seat 32, a layer of gelatin 35 is applied in the manner shown in Fig. 5. The emulsion 12 of the transparency and/or the gelatin layer 35 are treated with a suitable solvent or softening agent, such for example, as a water and alcohol solution. The emulsion 12 is then placed face down on the gelatin layer 35, as shown in Fig. 6, to adhere the transparency thereto so as to securely retain the transparency in position in the seat 32.

The present invention thus provides a mount in which the emulsion of the transparency is protected while the back is exposed to facilitate cooling during projection. The glass plate also affords the desired support for the transparency and retains the latter against buckling when used with high wattage lamps.

In the preferred embodiment, the second coating 21 is applied by spraying. Fig. 7, however, shows a modified arrangement of applying this second coating which is in the form of a sheet of metal 40, of suitable thickness, formed with a central aperture 41 equal in size to the seat 22. This metal sheet is provided with down turned edges 42 which overlie the edges 24 of the glass plate 17 to position the sheet on the glass plate. The slide with the sheet 40 in position thereon is then passed through an oven to fuse the sheet 40 to the sprayed layer 20 to provide, in effect, a single coating. The metal sheet 40 may be formed by punching or any other suitable method.

While one embodiment of the invention has been disclosed, it is to be understood that the inventive idea may be carried out in a number of ways. This application is, therefore, not to be limited to the precise details described but is intended to cover all variations and modifications thereof falling within the scope of the appended claims.

I claim:

1. A slide mount comprising, in combination, a rigid transparent support one surface of which is provided with a clear central portion adapted to frame an image area formed in an emulsion layer positioned on one side of a transparency, a thin opaque layer of metal on said surface surrounding said portion commensurate with and adapted to support the part of said transparency outside of said area, a thicker layer of metal applied to the part of said surface not occupied by said transparency, said transparency being positioned on said support with the emulsion side thereof toward said surface, and a layer of adhesive positioned on said portion and said first layer to secure said side thereto.

2. A slide mount comprising, in combination, a rigid transparent support one surface of which is provided with a thin area of metal commensurate with and adapted to support the marginal portions of a transparency one side of which has applied thereto an emulsion layer having an image-bearing part, a clear uncoated section inside said area to frame the image bearing part of said transparency, a thicker metal coating applied to the balance of said surface outside said area, and an adhesive layer positioned on said area and section to secure the emulsion side of said transparency thereto.

3. A slide mount comprising, in combination, a rigid transparent support, a metal coating applied to a surface of said support and formed to provide a recessed seat adapted to receive a film transparency one side of which has applied thereto an emulsion layer having an image section, a thin opaque metal layer around the edges of said seat to support the marginal portions of said transparency above said surface, a central uncoated area in said seat for framing the image section of said transparency, said transparency being positioned in said seat with the emulsion side toward said surface, and an adhesive layer for securing said emulsion to the area and layer.

4. A slide mount comprising, in combination, a rigid transparent support, a metal coating applied to a surface of said support and formed to provide a recessed seat adapted to receive a film transparency one side of which has applied thereto an emulsion layer having an image section, a thin opaque metal layer around the edges of said seat to support the marginal portions of said transparency above said surface, a central uncoated area in said seat for framing the image section of said transparency, said coating projecting above said transparency when the latter is positioned in said seat, said transparency being arranged in said seat with the emulsion side toward said surface, and an adhesive coating applied over said layer and area to secure said emulsion thereto.

5. A slide mount comprising, in combination, a rigid transparent support, a metal coating applied to a surface of said support and formed to provide a recessed seat adapted to receive a film transparency, a thin opaque metal layer around the edges of said seat to support the marginal portions of said transparency above said surface, a central uncoated area in said seat for framing the image section of said transparency, said coating extending above said transparency at the edges of said seat and increasing in thickness toward the sides of said support, said transparency being arranged in said seat with its emulsion side toward said surface, and an adhesive layer positioned between said emulsion and said layer area to secure said emulsion thereto.

6. A slide mount comprising, in combination, a rigid transparent support, a low melting-point metal coating on a surface of said support and arranged to form a recessed film-receiving seat adapted to receive a transparency positioned in said seat and provided with an emulsion side toward said surface, said emulsion side having an image area, a thin layer of a low-melting-point metal applied to said surface around the edges of said seat to receive the marginal portions of said transparency to support the latter above said surface, a central uncoated section in said seat to frame the image area of said transparency, said coating extending above said film at said seat and increasing in thickness toward the edges of said support, and an adhesive coating on said layer and section to secure said emulsion side thereto.

7. A slide mount comprising, in combination, a transparent glass support, a sprayed aluminum coating on a surface of said support arranged to provide a central recessed seat adapted to receive a film transparency arranged in said seat with the emulsion side positioned toward said support, a clear uncoated central portion in said seat for framing the image-bearing area of said transparency, a thin sprayed-aluminum layer on said surface and covering the balance of said seat outside said portion, and a gelatin layer positioned on said portion and said thin layer for securing said emulsion adhesively thereto to retain said transparency in position in said seat, said coating projecting above said transparency at said seat and increasing in thickness toward the marginal edges of said support.

8. A slide mount comprising, in combination, a rigid transparent support, a metal coating applied to a portion of a surface of said support to form a central recessed seat of a size adapted to receive a transparency, a central uncoated section on said surface in said seat of a size equal to the image area of said transparency, and a metal layer of less thickness than said coating applied to said surface around the edges of said section for supporting the edges of said transparency and for masking off said area.

9. A slide mount comprising, in combination, a rigid transparent support, a thin opaque metal layer arranged centrally on a surface of said support and having a central uncoated section on said surface adapted to frame the image area of a transparency, said layer being equal to the size of said transparency and supporting the portions thereof outside said area, and a thicker layer of metal applied to the balance of said surface outside said thin layer.

10. A slide mount comprising, in combination, a transparent glass support, a thin layer of sprayed metal applied to a surface of said support to provide a central uncoated section equal in size to an image area of a transparency, said layer having dimensions commensurate with those of said transparency and supporting the latter outside said area, and a thicker layer of sprayed metal applied over the balance of said surface outside said layer.

11. A method of forming a slide mount comprising, providing a rigid heated transparent support, placing centrally over a surface of said support a mask equal in size to an image area of a transparency, applying an opaque molten metal coating over the portion of said surface not occupied by said mask, removing said mask to provide a central uncoated section on said support equal in size to said area, placing on said surface concentrically with the area occupied by said first mask a second mask larger than said first mask and equal in size to the transparency, applying a second opaque molten metal coating of a thickness greater than the first coating over the balance of said first coating not covered by said second mask, removing said second mask to provide a seat which is equal in size to said transparency, and then positioning and adhesively securing said transparency in said seat.

12. A method of forming a slide mount comprising, providing a heated transparent glass support, placing centrally over a surface of said support a mask equal in size to an image area of a transparency, spraying a thin layer of molten metal on the portion of said surface not occupied by said mask, removing said mask to provide a central uncoated section equal to said area, placing on said surface substantially concentrically with said section a second mask larger than said first mask and equal in size to said transparency, spraying a thick layer of molten metal over the portion of said surface not occupied by said second mask, then removing the second mask to form a seat equal in size to said transparency and providing positioning shoulders for said transparency, and then securing said transparency in position in said seat.

13. A method of forming a slide mount comprising, providing a heated transparent glass support, placing centrally over a surface of said support a mask equal in size to an image area of a transparency, spraying a layer of metal on the portion of said surface not occupied by said mask, removing said mask to provide a central uncoated section equal to said area, placing on said surface substantially concentrically with said section a second mask larger than said first mask and equal in size to said transparency, spraying a second layer of metal over the portion of said surface not occupied by said second mask, and then removing the second mask, applying a layer of adhesive over said section and said first layer, and placing said transparency over said section and layer with the emulsion side in engagement with said adhesive and said area registering with said section.

14. A method of forming a slide mount comprising, providing a heated transparent glass sheet, placing centrally on a surface of said sheet a mask equal in size to an image area of a film transparency, spraying a layer of aluminum over the portion of said surface not occupied by said mask, removing said mask from said surface to provide a central uncoated section of a size equal to said area, placing on said coated surface and substantially concentric with said section a second mask larger than said first mask and equal to the size of said transparency, spraying a second layer of aluminum over the exposed part of said first layer, removing said second mask, coating said section and the exposed part of said first layer with a layer of gelatin, placing said transparency in position with the emulsion thereof in contact with said gelatin to adhere the transparency thereto.

ARTHUR B. FOX.

REFERENCES CITED

The following references are of record in the file of this patent:

UNITED STATES PATENTS

| Number | Name | Date |
|---|---|---|
| 291,544 | Snell | Jan. 8, 1884 |
| 785,534 | Anderson | Mar. 21, 1905 |
| 2,000,310 | White et al. | May 7, 1935 |
| 2,053,923 | Stewart | Sept. 8, 1936 |
| 2,119,608 | Stewart | June 7, 1938 |
| 2,197,274 | Menke | Apr. 16, 1940 |
| 2,228,352 | Hopfield | Jan. 14, 1941 |
| 2,428,043 | Searle | Sept. 30, 1947 |